Dec. 14, 1965    G. YARBROUGH    3,223,435
SHOCK ABSORBER TRAILER HITCH
Filed April 5, 1963    3 Sheets-Sheet 1
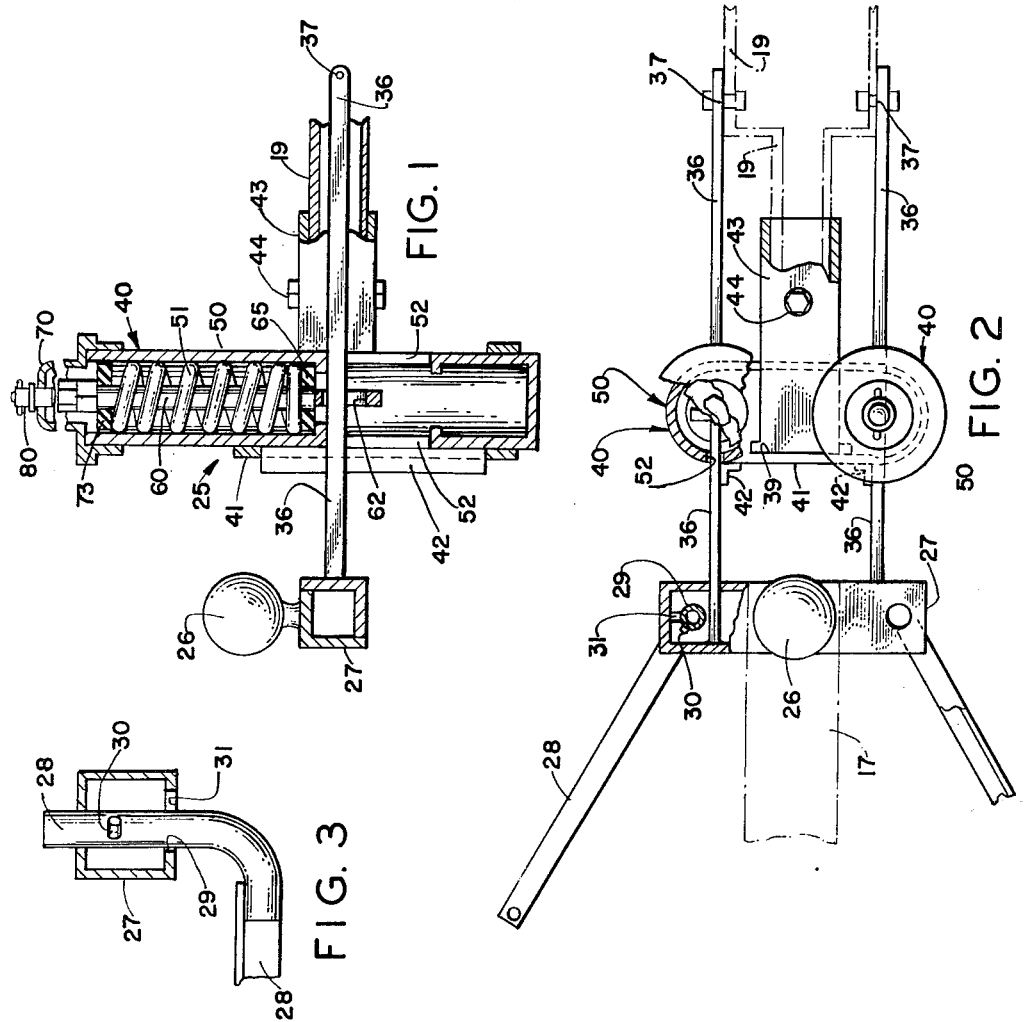
INVENTOR.
GLEN YARBROUGH
BY
ATTORNEY

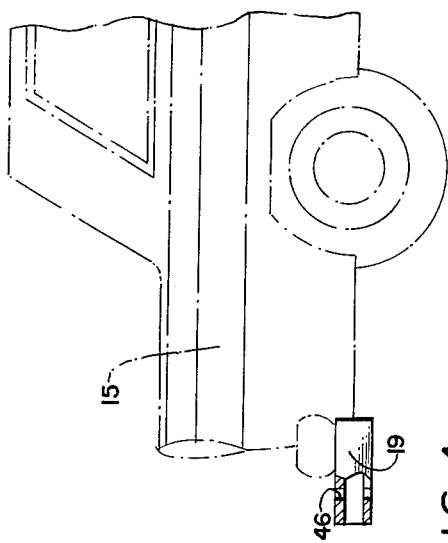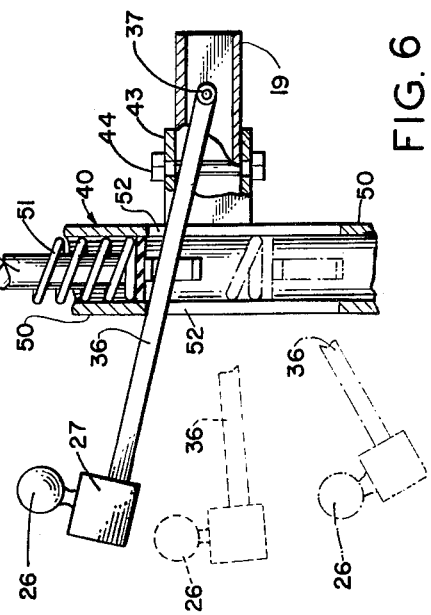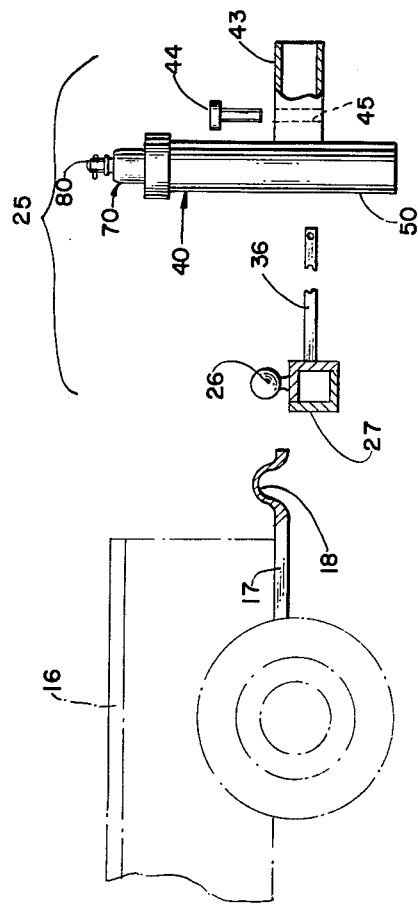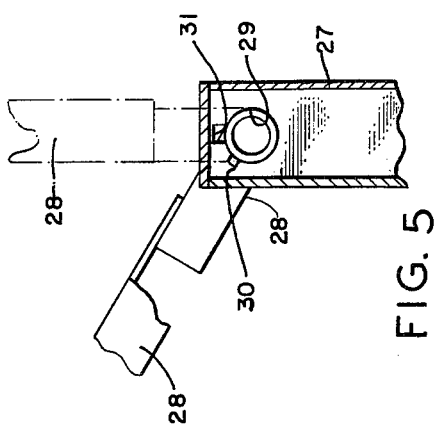

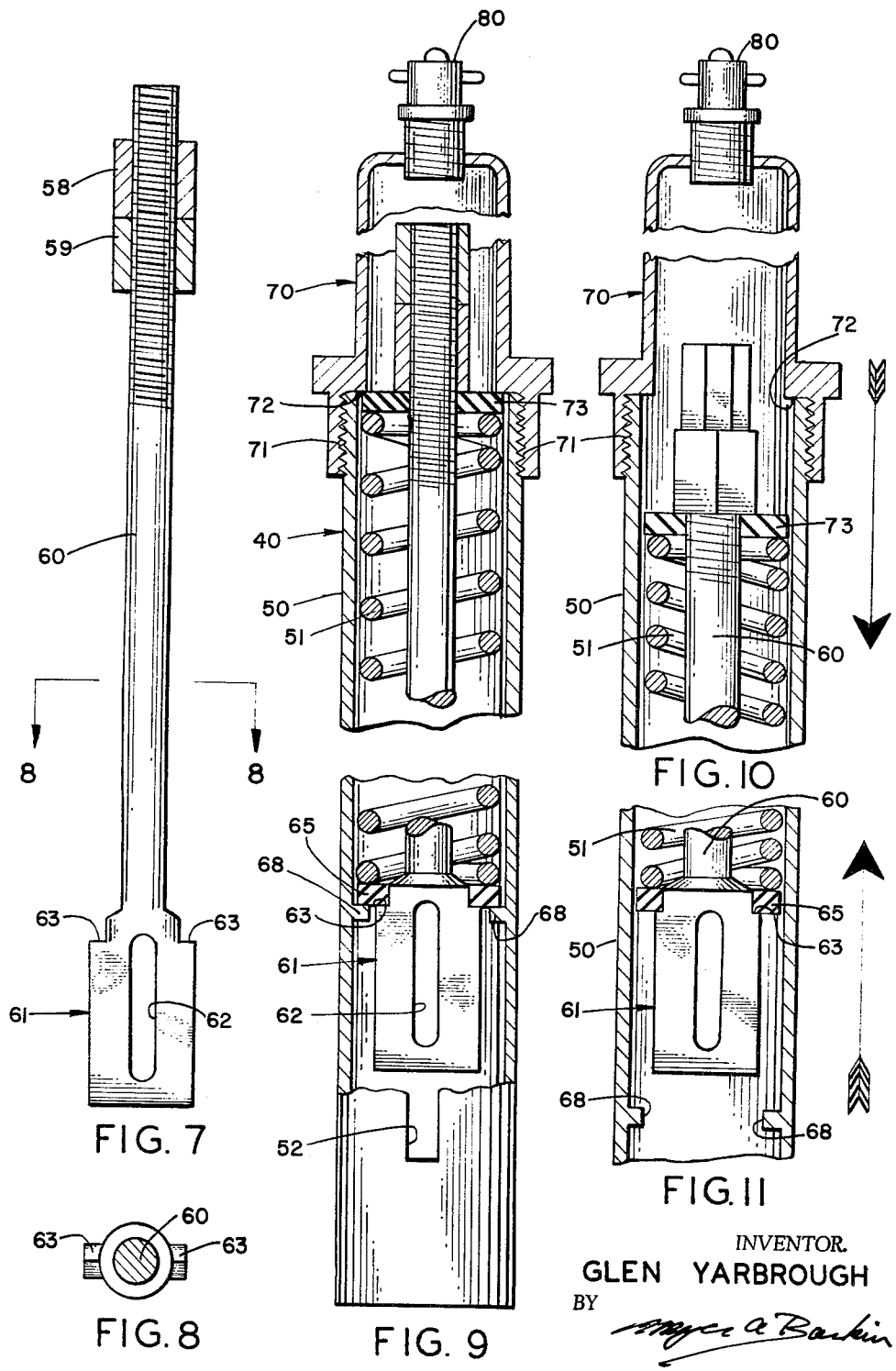

United States Patent Office 3,223,435
Patented Dec. 14, 1965

3,223,435
SHOCK ABSORBER TRAILER HITCH
Glen Yarbrough, P.O. Box 65, Washington, Ind.
Filed Apr. 5, 1963, Ser. No. 270,827
3 Claims. (Cl. 280—489)

This invention relates to a novel trailer hitch for connecting a trailer or the like to a towing automotive vehicle.

The invention relates more particularly to improvements in shock absorbing trailer hitches which may be of the well known ball and socket type, where in the shock between the trailer and towing vehicle and inherent in the use of all such connectors is abrosbed within the trailer hitch by the provision of a novel arrangement of spring means and associated parts which comprise the hitch.

The principal object of this invention is to provide a novel shock absorber in a trailer hitch.

Another object is to provide a shock absorber trailer hitch of improved design which permits high speed operation over rough terrain and poor roads without damage to either the trailer, the towing automotive vehicle or the hitch itself, and provides a smoother and safer ride.

Still another object is to provide an easily removable shock absorber trailer hitch, the major parts of which are easily demountable and readily disconnected from the towing automotive vehicle when not in use in a manner which leaves an attractive and clean appearance to the rear end of the towing vehicle and avoids the usual unsightly look of a rear end projecting ball joint at the rear of the automobile common to all devices in use today when the trailer is disconnected.

A still further object of the novel shock absorber trailer hitch of this invention is the provision of means to use a variety of interchangeable springs of different weights, tensions or strengths within a single shock absorber hitch to readily and quickly accommodate a variety of different size, length and weight of trailers.

Yet another object of this invention is to provide a novel apparatus for effectively cushioning upward and downward shock thrusts wherein the key operating movable parts are contained within a protective enclosing housing which excludes dirt, mud, snow, ice, water and other undesirable foreign matter and also provides means for easy lubrication of the major operating mechanism and retaining the lubricant.

Another object is to provide a shock absorber trailer hitch, the novel combination and arrangement of operating parts of which is of durable design, efficient in use, of low cost, and may be readily assembled and disassembled between the trailer and towing automotive vehicle in a minimum of time and with a minimum of effort by an inexperienced operator.

Another object is to provide a novel connecting and disconnecting means for a pair of stabilizer or angularly extending hitch bars or tongues which are used to prevent side-sway and "jacknifing" and cause the trailer to ride more smoothly and safely.

Other objects and advantages will readily become apparent to those skilled in the art from the following detailed description of the invention and accompanying drawings in which:

FIGURE 1 is a cross-sectional side-view of one of the shock absorbers of the trailer hitch of this invention illustrating the ball portion of the hitch in operating association therewith;

FIGURE 2 is a top plan view of the shock absorber hitch illustrating the pair of stabilizer bars connected in operating position, parts being broken away to more clearly illustrate certain of the parts;

FIGURE 3 is an enlarged fragmentarl bottom view illustrating the means of connecting the stabilizers to the mechanism;

FIGURE 4 is a diagrammatic exploded view of the parts of the hitch illustrating the order which they assume between the trailler and towing automotive vehicle before connection;

FIGURE 5 is an enlarged fragmentary top view further illustrating the novel stabilizer connecting means;

FIGURE 6 is a fragmentary side view partly in cross section illustrating the upward and downward path of movement of the ball joint of the hitch;

FIGURE 7 is an enlarged detail view of the hanger element;

FIGURE 8 is a cross sectional view of the hanger shown in FIGURE 7, taken along line 8—8 and looking in the direction indicated by the arrows;

FIGURE 9 is an enlarged fragmentary side view of one of the shock absorber elements shown within its housing in neutral position, parts being broken away to illustrate the parts more clearly;

FIGURE 10 is an enlarged fragmenary view of the upper portion of the shock absorber shown in FIGURE 9, illustrating the coil spring compressed downwardly away from its upper seat, in the direction indicated by the arrow, by a downward pulling movement of the hanger, and;

FIGURE 11 is an enlarged fragmentary view of the lower portion of the shock absorber shown in FIGURE 9, illustrating the coil spring compressed upwardly away from its lower seat, in the direction indicated by the arrow, by an upward thrusting movement of the hanger.

Referring now to the drawings in detail and the following description in which like reference numerals designate like parts throughout the several views, there is illustrated, in FIGURE 4, a diagrammatic partial end view in broken lines the rear end of an automative vehicle 15, which is the towing vehicle, a trailer 16, having a conventional tow bar 17, with a socket 18, associated therewith. A short connector member 19 is fixed to the rear end of the towing vehicle 15. These parts are more or less conventional and well known in this art, and can be of any suitable shape, material or design.

The novel shock absorber hitch of this invention, together with the ball joint is indicated in general by the numeral 25, a ball 26, which is adapted to be operatively connected with the socket 18, of the tow bar 17, of trailer 16, in any conventional well known manner, is fixedly mounted on a transversely extending cross member 27, see FIGURES 1, 2, 4 and 6, which may be made of angle iron or any other desirable material.

The cross member 27, also serves to receive and support, at each of its ends, a pair of horizontally extending stabilizer members 28, which may be made of steel rods, angle iron or any other suitable material, and which extend rearwardly at an angle from the cross member 27 to the trailer 16 to which they are suitably connected.

The means for assembling the stabilizer members in operative association with the cross member 27, is novel. A round aperture 29, formed in the bottom side of the cross member 27, see FIGURES 2, 3, and 5, is adapted to rotatably receive round upturned angle bars 28, to which a right angled sideways projecting lug, 30 acting as a key is fixed. A slot 31, or key way is formed in the bottom side of cross member 27, extending radially outward from aperture 29, as shown in the drawings. The rounded upturned ends of stabilizers 28 project through aperture 29, when the outwardly projecting lug 30 is in alignment with bottom slot 31, which is the position of the stabilizer bar 28, bears to cross member 27 as shown in the broken lines in FIGURE 5. When the stabilizer bar 28 is turned towards the trailer in the normal operating angle as shown in the solid lines in FIGURES 5 and 2, it is readily apparent that the stabilizer bars 28 are retained in operating position by reason of lug 28 being turned out of alignment with the slot or key way 31. Thus the stabilizer bars may be easily connected with ball carrying cross member 27 and disconnected therefrom by a simple turning action.

The shock absorber trailer hitch 25 comprises the following described combination and arrangement of parts. The transversely extending cross member 27 which carries the ball portion 26 of the ball and socket joint of the trailer hitch is fixedly mounted on a pair of forwardly projecting normally horizontally arranged arm members 36. These arms 36 are wider than their thickness for reasons and purposes which will become hereinafter apparent. See FIGURES 1, 2, 4 and 6. Each of the pair of arms 36 are fixed by welding or in any other suitable manner to the ball carrying cross member 27 at their rearward ends towards the outer transverse ends of cross member 27 but inwardly of stabilizer bars 28 as best shown in FIGURE 2.

The arms 36 are pivotally mounted at their forward ends at 37 as shown in FIGURES 1, 2 and 6 to the member 19 which is fixed to the towing automotive vehicle 15.

This member 19 which is welded or other wise premanently fixed to the rear end of tow vehicles 15, is preferably arranged in relation to the underside of the trunk or rear bumper thereof in a manner to be "out of sight" when the ball 26 and the transversely extending member 27 on which the ball is mounted have been dismounted or disconnected from the tow vehicle 15. The diagramatic showing of member 19 in FIGURE 4 mounted on vehicle 15 is merely for the purpose of illustration. Thus, when the automotive vehicle is being driven without pulling a trailer as is frequently the case the rear view of the automobile present a clean trim appearance being free of the unsightly look which the projecting ball would otherwise present as is common in all other types of ball trailer hitches when the trailer has been disconnected.

Referring now to FIGURE 2 which is a top plan view of the shock absorber hitch which clearly shows the side by side arrangement of the two vertically disposed shock absorbers and the associated ball joint mounted on its transverse supporting member 27. The number 25 indicates in general the combined elements of the hitch which are completely removable as a unit from the automotive towing vehicle 15 and may be stored in the trunk of the vehicle out of sight when not in use.

A pair of shock absorebrs 40 are arranged in parallel vertical relation and welded to a cross brace back member 41 having angle iron corner members 42 welded thereto and which extend vertically. Angle iron corner members 42 are not connected to the forwardly projecting arms 36, but rather serve as guides therefor as they are inserted forwardly through shock absorbers 40, as will be hereinafter described. Steel support straps 39 encircle shock absorbers 40 and are welded thereto to add strength.

A forwardly projecting connector member 43 is welded to the forward side of cross brace back member 41 at 39, see FIGURE 2, and serves to connect the shock absorber hitch 25 with the tow vehicle 15. Member 43 is hollow and serves as the female member and is designed to slip over member 19 which serves as the male member of the two vehicle 15, FIGURES 1, 2 and 4 in a telescoping maner as shown. Bolt or pin 44 is inserted through hole 45 in member 43 and hole 46 in member 19 when the holes are aligned.

The pair of shock absorbers 40 are identical. Each includes an elongated cylinder 50 which serves as a protective housing for a vertically disposed coil spring 51. The cylinder 50 has a pair of vertical diametrically opposed slots 52 one at the front side and one at the rear side of the cylinder as well shown in FIGURES 1, 2 and 6. The slots 52 permit the narrow flat forwardly projecting arms to pass through the cylinder 50 and move upwardly and downwardly as shown in FIGURE 6. These arms serve as the pull bars.

The novel combination and arrangement of parts and mechanism in which the shock absorber is constructed and operated in cooperation with the novel ball joint support includes the provision of an elongated hanger member 60 shown in FIGURES 7 and 8. This hanger member consists of a long rod screw threaded at its upper end to receive a pair of lock nuts 58 and 59. The lower end of the hanger rod 60 has formed thereon a relatively wide flat portion 61 with a vertical slot 62 therein adapted to receive the flat forwardly projecting arms 36 which pass through slot 62 as shown in FIGURES 1, 2 and 6.

A transversely extending shoulder 63 is formed at the upper end of flat portion 61 on each side thereof to serve as a seat for and to engage a lower spring support washer 65 in a manner and for a purpose to be hereinafter described. A neck portion 66 formed on rod 60 immediately above seat 63 serves to align washer 65.

Two or more if desired inwardly extending projections 68 are formed in any suitable manner to extend radially inward of the inner wall of the cylinder 50 in which coil spring 51 is housed and serve as a seat for lower washer 65 and limit the downward movement of spring 51.

The upper end of cylinder 50 is closed by a closure cap 70 screw threaded thereon at 71 see FIGURES 9 and 10. An inwardly extending ring seat 72 is formed on the inner wall of closure cap 70 and serves to limit the upward movement of upper spring washer 73 and so limit the extent of upward movement of spring 51.

The tension of spring 51 may be increased or decreased by adjusting the screw threaded closure cap 70 by means of threads 71 to raise or lower the seat 72. Any other desired type of closure means may be employed. For example, closure 70 may be adjustably arranged on the upper end of sleeve 50 by screw threads formed on the inner cylindrical surface of sleeve 50.

Suitable lock nuts, not shown, or other means to maintain closure cap 70 in desired adjusted position may be employed.

Lock nut 59 serves as a shoulder to engage upper washer 73. By adjusting nut 59 to the position illustrated in FIGURE 9 and with both upper spring washer 73 on its seat 72 and lower spring washer 65 on its seat 68 the coil spring 51 is compressed and retained under tension between its upper and lower limits or what neutral position. This is the position the parts will normally assume when the tow vehicle 15 and trailer 16 are standing on a level road or being pulled along a smooth flat horizontally level highway surface.

The operation is as follows:

Arms 36 are passed through slots 52 of cylinder 50 and slot 62 of hanger 60 and pivotally attached at 37 to member 19 which is fixed to vehicle 15. The shock absorber assembly 40 is attached to vehicle 15 through female member 43 being telescoped over male member 19 and fastened in place by bolt or pin 44 all as shown in the drawings. Tow bar 17 of trailer 16 is arranged with its socket 18 covering and engaging ball 26 in the well known conventional fashion.

When pulled over rough terrain, washboard roads, bumps, holes and railroad tracks, for example, the ball and socket connection will bound upwardly and downwardly in reaction to the rough surface being traversed. These up and down movements will cause the arms 36 to move up and down on pivot 37 within slots 52 of cylinder 50, see FIGURE 6.

The hanger 60 of each of the pair of shock absorbers 40 will also be caused to move upwardly and downwardly because of their connection with arms 36 through slots 62.

A downward or dropping movement will cause hanger rod 60 to pull washer 73 downwardly in the direction indicated by the arrow as shown in FIGURE 10 and the respective parts of the assembly will assume the position indicated in FIGURE 10 of the drawing.

In this position the locknut 59 which engages upper washer 73 will pull the washer down compressing spring 51 as shown in FIGURE 10. Thus the downward drop is cushioned against shock.

In FIGURE 11, the respective parts of shock absorber 40 are shown in the position they will assume when an up thrust or upward movement of the ball and socket connection takes place. In this condition the hanger rod 60 has been thrust upwardly in the direction indicated by the arrow by arm 36. This action has caused lower spring washer 65 to move upwardly from its seat 63 which limits its downward travel compressed spring 51 as shown and thus the shock of the upthrust has been eliminated by the cushioning effect of the compression spring 51.

The inner diameter of the center hole in upper washer 73 through which hanger rod 60 reciprocates should preferably be of a size relative to the outer diameter that a snug sliding fit is provided such as for example that of a piston within a cylinder. This insures smooth reciprocal action and guides hanger rod 60 smoothly and in a straight line in its upward and downward reciprocations.

The top of closure cap 70 is provided with a grease fitting 80 of any well known currently used type such as an "Alemite" fitting for example, by which means the shock absorber cylinder can be kept packed with a suitable grease or other lubricant. This grease loaded structure thus provides a housing which tends to keep out undesirable foreign matter such as water, mud, ice, snow and the like.

An important feature of this invention is that a variety of coil springs of different tensions and strengths may be exchanged and substituted one for the other in the same spring housing 50. For example a two hundred pound trailer, when resting on the ball, of about 19 feet in length might use a coil spring approximately fourteen inches long of medium strength and tension. Whereas a seven hundred pound trailer, when resting on the ball, which might be thirty to forty feet long such as a "mobile home" would require a coil spring of greater strength and tension. An exchange of coil springs may be made using the same hitch.

The dimensions of the parts distance of travel of the hanger rod up and down and other details will vary with the size and weight of the trailer to be pulled. One built and used in accordance with the drawings accompanying this application provided for a downward travel of the hanger rod of about three and one half and an upward travel of about two inches or an overall possible reciprocation of about five and one half inches. The hanger rod outside diameter was about one half inch. Other models and sizes may be utilized.

This invention provides a shock absorber hitch which is both useful and novel. The specific structure disclosed may be changed and modified by persons skilled in the art without departing from the spirit and intent of the invention or the scope of the appended claims.

What is claimed is:

1. A shock absorber trailer hitch including a ball and socket connector joint for operatively joining a trailer and a tow vehicle which includes, a pair of juxtaposed vertically arranged compression coil springs each enclosed in a protective cylindrical housing which completely surrounds and encloses the coil spring a pair of vertical diametrically disposed slots extending through the cylindrical wall of said housing, a radially inwardly projecting lower fixed seat located within each housing and arrranged to support the lower end of the coil spring and to limit the extent of its downward movement within the housing, another radially inwardly projecting upper adjustable seat located within each housing and arranged to support the upper end of the coil spring and to limit the extent of its upward movement within the housing, and a pair of horizontally disposed elongated arms pivotally connected to the tow vehicle and extending through the vertical slots in the housing and adapted to engage and to compress said coil spring to absorb shock both upon the upward and downward movement of the ball and socket connector joint which may occur as the trailer and tow vehicle are moving over rough terrain.

2. A shock absorber trailer hitch as described in claim 1 wherein a screw cap top cover is removably mounted on the top of each coil spring housing cylinder in a manner to permit withdrawal of the coil spring and insertion of a different coil spring of different tension and strength without disturbing the other combined elements of the shock absorber.

3. A shock absorber trailer hitch, including a ball and socket connector point, for operatively joining a trailer and a tow vehicle, the socket portion being fixed to the trailer and the ball portion being fixed to a transversely disposed cross member, said cross member being fixed to the outer ends of a pair of horizontally disposed elongated arms which are pivotally mounted at their inner ends to the sprung frame portion of the tow vehicle, a pair of vertically disposed coil springs, each incased and operatively mounted in a cylindrical housing, diametrically disposed vertical slots in the sides of said housing, the horizontal pivoted arms being passed through said housing, a vertical hanger rod extending through the center of each of said coil springs, means to limit the upper and lower compressive movement of said springs operatively connected with the lower end of the hanger springs to cause compression thereof upon upward and downward movement of said rods, said hanger rods having vertical slots formed in their lower ends of the hanger rod, through which the pivoted elongated arms may extend as they are passed through the vertical diametrically disposed slots of the spring housings, said pivoted arms being in close operative contact with the top and bottom of the slots in the hanger rods in a manner to cause upward and downward movements of the rods coincident with the upward and downward movement of the ball member of the socket connector carried by the horizontal pivoted arms.

References Cited by the Examiner

UNITED STATES PATENTS

| | | | |
|---|---|---|---|
| 1,908,711 | 5/1933 | Kuchar | 280—489 X |
| 1,991,684 | 2/1935 | Ketel | 280—486 X |
| 2,463,140 | 3/1949 | Bihn | 280—489 X |
| 2,660,444 | 11/1953 | Cade et al. | 280—515 |
| 2,698,667 | 1/1955 | Kropp | 180—6.7 X |
| 2,852,274 | 9/1958 | Seiley | 280—489 |
| 3,021,154 | 2/1962 | Hedgepeth | 280—406 |

A. HARRY LEVY, *Primary Examiner.*

KENNETH H. BETTS, *Examiner.*